United States Patent
Mizunoue et al.

(10) Patent No.: US 10,975,728 B2
(45) Date of Patent: Apr. 13, 2021

(54) FLUID DEVICE

(71) Applicant: MITSUBISHI HEAVY INDUSTRIES COMPRESSOR CORPORATION, Tokyo (JP)

(72) Inventors: Toshio Mizunoue, Tokyo (JP); Kazutoshi Yoko, Tokyo (JP); Eiichi Yanagisawa, Tokyo (JP); Shin Yanagisawa, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 68 days.

(21) Appl. No.: 16/546,609

(22) Filed: Aug. 21, 2019

(65) Prior Publication Data

US 2019/0376417 A1      Dec. 12, 2019

Related U.S. Application Data

(63) Continuation of application No. PCT/JP2018/012536, filed on Mar. 27, 2018.

(30) Foreign Application Priority Data

Mar. 29, 2017   (JP) ............................ JP2017-066345

(51) Int. Cl.
    *F01D 25/24*    (2006.01)
    *F04D 29/52*    (2006.01)
    *F04D 29/40*    (2006.01)

(52) U.S. Cl.
    CPC ......... *F01D 25/243* (2013.01); *F04D 29/406* (2013.01)

(58) Field of Classification Search
    CPC ... F01D 25/243; F04D 29/522; F05D 2260/31
    See application file for complete search history.

(56) References Cited

U.S. PATENT DOCUMENTS 5,253,875 A * 10/1993 Gentile ................. F01D 11/003
                                                    277/313
5,263,997 A * 11/1993 Parker .................. F01D 25/243
                                                    415/214.1

(Continued)

FOREIGN PATENT DOCUMENTS

EP          2025882 A1    2/2009
JP      S52-119704 A     10/1977

(Continued)

OTHER PUBLICATIONS

International Preliminary Report on Patentability in corresponding International Application No. PCT/JP2018/012536, dated Oct. 10, 2019 (6 pages).

(Continued)

*Primary Examiner* — Ninh H. Nguyen
(74) *Attorney, Agent, or Firm* — Osha Bergman Watanabe & Burton LLP

(57) ABSTRACT

Flanges of half bodies provided in a compressor casing are fastened by multiple bolts and a multi-hole washer shared by two or more adjacent bolts. When F is fastening force, T is a thickness of the washer, θ is a distribution angle of the fastening force, Rb is a radius of the bolt, R is a radius of a distribution range of the fastening force on a bearing surface, A is an area of the distribution range on the surface, a is an area of a distribution range of the fastening force on a mating surface of the flange, and R=Rb+T·tan θ and A=πR2 are established, F/A is lower than yield strength of each of a flange material and a multi-hole washer material, and F/a is equal to or higher than predetermined surface pressure determined based on pressure of fluid inside the casing.

17 Claims, 9 Drawing Sheets

(56) References Cited

U.S. PATENT DOCUMENTS

| | | | |
|---|---|---|---|
| 6,381,827 B1 * | 5/2002 | Steinbock | B23P 19/068 29/452 |
| 7,198,465 B1 * | 4/2007 | Ichiryu | F01D 25/243 415/214.1 |
| 2019/0048877 A1 | 2/2019 | Yoko et al. | |

FOREIGN PATENT DOCUMENTS

| | | |
|---|---|---|
| JP | H08-232893 A | 9/1996 |
| JP | H08-284610 A | 10/1996 |
| JP | H10-89011 A | 4/1998 |
| JP | 2010209750 A | 9/2010 |
| WO | 2017-168479 A1 | 10/2017 |

OTHER PUBLICATIONS

European Office Action in corresponding European Application No. 18 774 866.0, dated Jul. 9, 2020 (7 pages).

* cited by examiner

FLUID DEVICE

TECHNICAL FIELD

The present invention relates to a fluid device such as a compressor that includes a casing in which flanges are fastened together.

BACKGROUND ART

A compressor includes a rotor coupled to a rotary shaft, bearings supporting the rotary shaft, and a casing containing the rotor. The compressor sucks gas from a suction port into the casing and compresses the sucked gas through rotation of the rotor, and discharges the compressed gas from a discharge port.

The casing of the compressor is typically divided in a horizontal direction, and a flange of an upper half body and a flange of a lower half body are fastened together by bolts (Patent Literature 1).

In Patent Literature 1, a groove and a protrusion formed on mating surfaces of the flanges engage with each other to prevent high-pressure gas inside the casing from being leaked to outside from a gap between the flanges.

CITATION LIST

Patent Literature

Patent Literature 1: JP 973814 B2 (JP S52-119704 A)

SUMMARY OF INVENTION

Technical Problem

The high-pressure high-temperature gas is contained inside the casing. Therefore, if pressure of the gas acts or thermal deformation is caused by temperature difference between the high-temperature gas and the bearings, the gas may be leaked from a gap between the mating surfaces of the flanges.

Even when the groove and the protrusion are provided on the mating surfaces of the flanges as countermeasures to prevent the leakage as disclosed in Patent Literature 1, the gas is leaked depending on the pressure of the gas or if the flanges are deformed by temperature gradient.

To prevent the leakage, axial force (fastening force) of each of the bolts obtained by fastening are desirably sufficiently distributed not only near the shaft of each of the bolts but also around the shaft, and predetermined surface pressure is accordingly desirably secured over a wider range of the mating surfaces of the flanges.

In this case, a washer is disposed between a head part of each of the bolts and the flanges or between a nut attached to each of the bolts and the flanges. The fastening force distributed by the washer is limited to a range close to a shaft of one bolt provided with the washer. Therefore, an effect to prevent the leakage is limited. When a thickness of the washer is increased, the range where the fastening force is distributed is expanded; however, it is not sufficient for prevention of the leakage.

When a through bolt that penetrates both of the abutted flanges is used in order to prevent the leakage, the fastening force is increased, and the fastening force is distributed to the wider range around the shaft, as compared with a stud bolt. It is, however, difficult to secure surface pressure of the mating surfaces over a wide range enough to sufficiently prevent the leakage, only by the use of the through bolt.

Accordingly, an object of the present invention is to provide a fluid device that makes it possible to sufficiently prevent leakage of fluid from a gap between flanges.

Solution to Problem

A fluid device according to the present invention includes a casing into which a fluid is introduced, and the casing includes half bodies. Flanges provided on the respective half bodies are abutted on each other and fastened together with use of a plurality of fastening members and a washer shared by two or more adjacent fastening members out of the plurality of fastening members.

In this case, F is fastening force by each of the fastening members, T is a thickness of the washer, θ is a distribution angle of the fastening force distributed to the flanges from a fastening end part that is an end part of each of the fastening members disposed on the washer, through the washer, Rb is a radius of the fastening end part, R is a radius of a distribution range of the fastening force on a bearing surface of the flange supporting the washer, A is an area of the distribution range of the fastening force on the bearing surface, a is an area of a distribution range of the fastening force on a mating surface of each of the flanges.

When $R=Rb+T\cdot\tan\theta$ and $A=\pi R^2$ are established, F/A is lower than yield strength of a material for the flanges and yield strength of a material for the washer, and F/a is equal to or higher than predetermined surface pressure that is determined based on pressure of the fluid inside the casing during operation.

In the fluid device according to the present invention, the area a of the distribution range of the fastening force on the mating surface of each of the flanges preferably corresponds to a lateral cross-sectional area of the washer.

In the fluid device according to the present invention, at least a part of the plurality of fastening members is preferably a stud bolt including screws on respective ends.

In the fluid device according to the present invention, at least a part of the plurality of fastening members is preferably a through bolt that penetrates through both of the abutted flanges.

In the fluid device according to the present invention, the washer is preferably disposed on each of one end side and another end side of the through bolt, and the through bolt, the washer, and the flanges fastened by the through bolt are preferably disposed line-symmetrically with respect to the mating surfaces.

In the fluid device according to the present invention, the casing preferably contains a compression mechanism compressing the fluid.

In this case, a discharge volute through which the compressed fluid passes toward a discharge port of the fluid device is preferably provided to expand toward an inside of the casing in an axis direction.

Advantageous Effects of Invention

According to the present invention, using the multi-hole washer shared by the plurality of fastening members makes it possible to largely expand both of the distribution range of the fastening force on the bearing surface and the distribution range of the fastening force on the mating surfaces of the flanges including the region between the adjacent fastening members, as compared with a washer for a single fastening member. Accordingly, stress distribution on the mating surfaces of the flanges during the operation is brought close to uniform distribution while preventing the washer and the flanges from yielding on the bearing surface. This makes it possible to maintain the fastening force and to sufficiently suppress leakage while avoiding local yield of the flanges caused by increase of the internal pressure and the thermal deformation.

DESCRIPTION OF EMBODIMENTS

Figure 1:
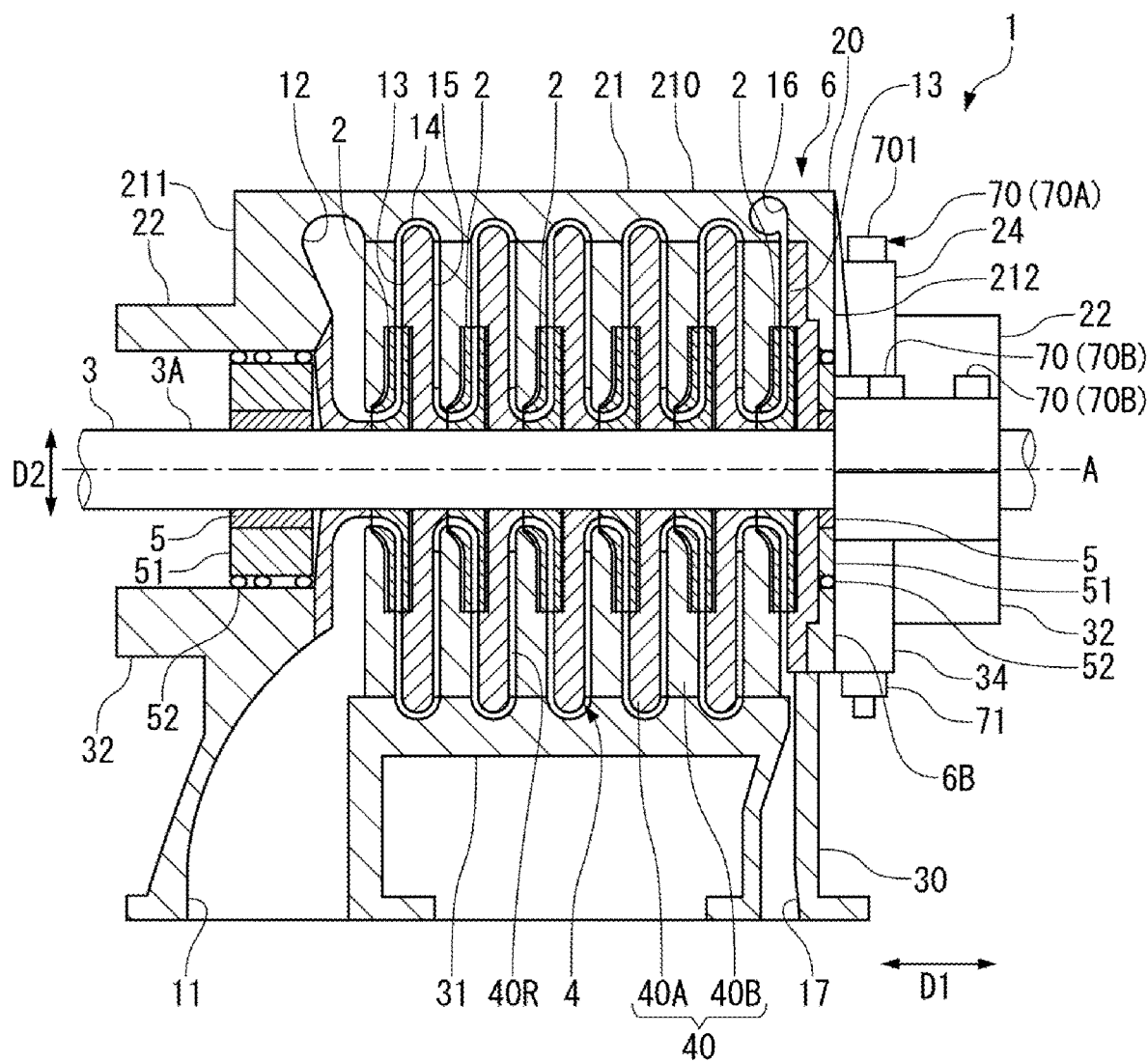
FIG. 1 is a vertical cross-sectional view illustrating a centrifugal compressor according to an embodiment of the present invention, and corresponds to a cross-sectional view taken along a line I-I of FIG. 3.

An embodiment of the present invention is described below with reference to accompanying drawings.

A fluid device in which flanges are fastened together is described below with reference to the accompanying drawings. In the present embodiment, a centrifugal compressor is described as an example of the fluid device.

[Configuration of Centrifugal Compressor]

First, a configuration of a centrifugal compressor 1 according to the present embodiment is described with reference to FIG. 1 to FIG. 3.

The centrifugal compressor 1 (hereinafter, compressor 1) is configured as a multistage type including a plurality of impellers 2. The compressor 1 is incorporated in plant facilities or the like, and compresses introduced process gas and discharges the compressed process gas.

The compressor 1 includes a rotor 3 provided with the plurality of impellers 2, a diaphragm group 4, a seal device 5, and a casing 6 including an upper-half casing 20 and a lower-half casing 30.

The rotor 3 includes a rotary shaft 3A extending along a horizontal direction, and the plurality of impellers 2 coupled to an outer peripheral part of the rotary shaft 3A. An axis of the rotary shaft 3A is denoted by A, and a direction along the axis A is referred to as an axis direction D1. Both end parts of the rotary shaft 3A are supported by unillustrated respective bearings outside the casing 6.

The plurality of impellers 2 are rotated with rotation of the rotary shaft 3A by a driving source such as a motor connected to the rotary shaft 3A. As a result, the impellers 2 compress the process gas (working fluid) by centrifugal force.

The diaphragm group 4 includes a plurality of diaphragms 40 that are arranged along the axis direction D1 so as to correspond to the plurality of impellers 2. Each of the diaphragms 40 includes members 40A and 40B that are coupled to each other through a return vane 40R.

The diaphragm group 4 covers the impellers 2 from outer peripheral side.

The diaphragms 40 and an inner wall of the casing 6 form a flow path that communicates with flow paths of the respective impellers 2 to cause the process gas to pass therethrough.

The process gas sucked from a suction port 11 into the casing 6 by rotation of the rotor 3 flows into the impeller 2 of a first stage through a suction flow path 12, flows from an outlet of the flow path of the impeller 2 toward outside in a radial direction through a diffuser flow path 13, further passes through a bent flow path 14 and a return flow path 15, and flows into an inlet of the flow path located on inner side of the impeller 2 of the next stage. Further, the process gas repeatedly flows into the next impeller 2 through the flow path of the impeller 2, the diffuser flow path 13, the bent flow path 14, and the return flow path 15. Then, the process gas is discharged from the impeller 2 on the final stage to the outside of the casing 6 through the diffuser flow path 13, a discharge volute 16, and a discharge port 17.

The discharge volute 16 is provided in an annular shape over an entire circumferential direction of the casing 6. The discharge volute 16 is provided so as to expand toward the inside (upstream side) in the axis direction D1 with respect to a position on an extension of the diffuser flow path 13 through which the high-pressure gas flowing out from the impeller 2 of the final stage flows.

In the present embodiment, the expanding direction of the discharge volute 16 is determined to the inside in the axis direction D1, which prevents a rear end part of the casing 6 from swelling toward downstream side in the axis direction D1.

A rear end part of the upper-half casing 20 of the casing 6 includes a pedestal 24 that is higher in height than a flange 61 (FIG. 2) of the upper-half casing 20, and a rear end part of the lower-half casing 30 includes a pedestal 34 that is higher in height than a flange 62 (FIG. 2) of the lower-half casing 30.

The seal device 5 (FIG. 1) seals a gap between the outer peripheral part of the rotary shaft 3A and the casing 6 over the entire circumference to prevent the process gas from being leaked to the outside of the casing 6. As the seal device 5, a labyrinth seal is suitable.

The seal device 5 is disposed on each of end sides of the rotary shaft 3A, and is held by a seal housing holder 51. A gap between an outer peripheral part of the seal housing holder 51 and the casing 6 is sealed by a seal member 52.

The casing 6 is formed in a substantially cylindrical shape. The casing 6 contains the rotor 3 and the diaphragm group 4, and surrounds the outer peripheral part of the seal housing holder 51.

The casing 6 can be formed of a metal material having corrosion resistance to the process gas to be contacted. The casing 6 according to the present embodiment is made of stainless steel.

The casing 6 includes the upper-half casing 20 (FIG. 1 to FIG. 3) and the lower-half casing 30 (FIG. 1 and FIG. 2) that are divided along a horizontal plane including the axis A. The upper-half casing 20 and the lower-half casing 30 are integrated through fastening of the respective flanges 61 and 62 together.

Figure 2:
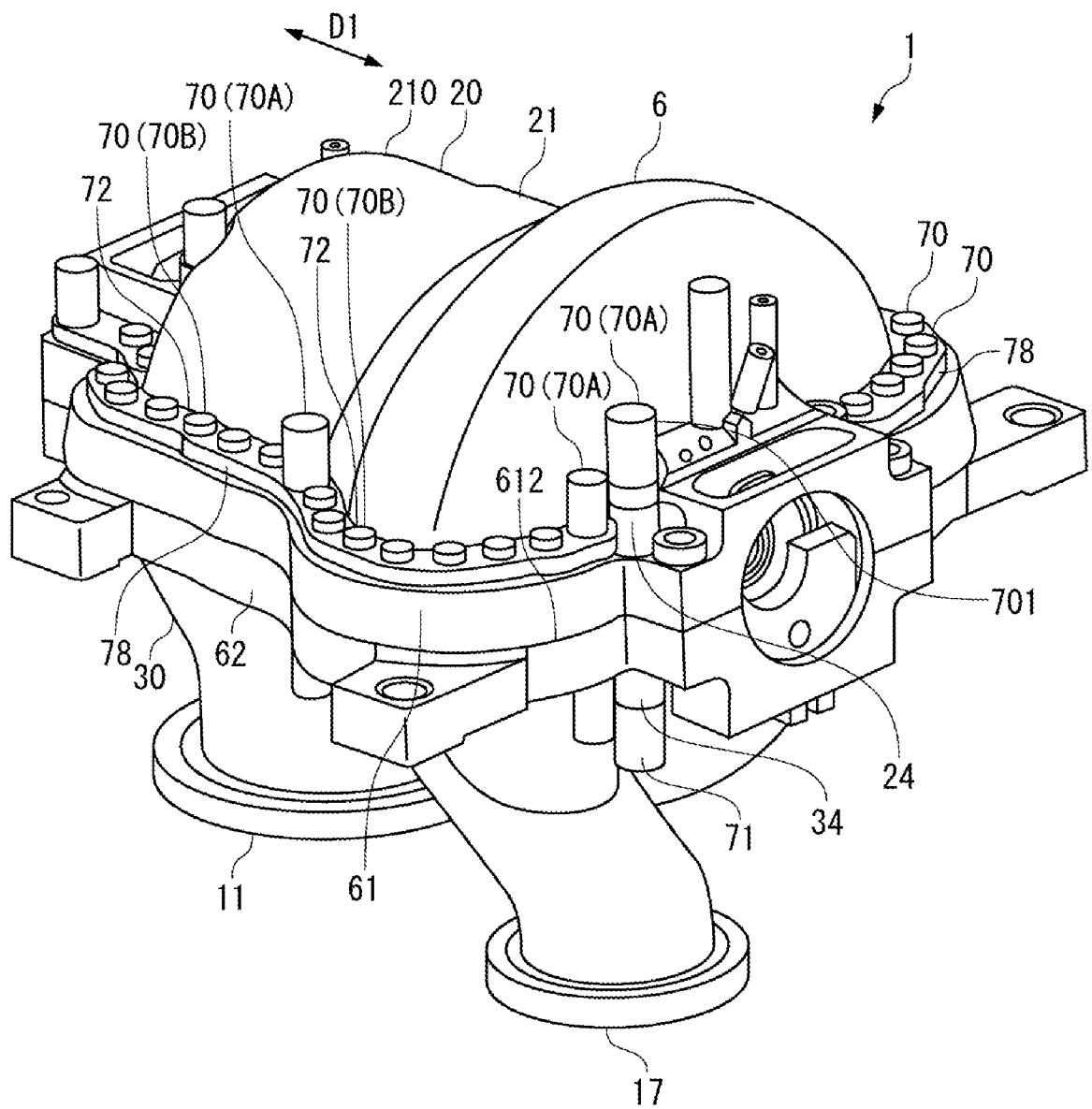
FIG. 2 is a perspective view illustrating the compressor illustrated in FIG. 1.
Figure 3:
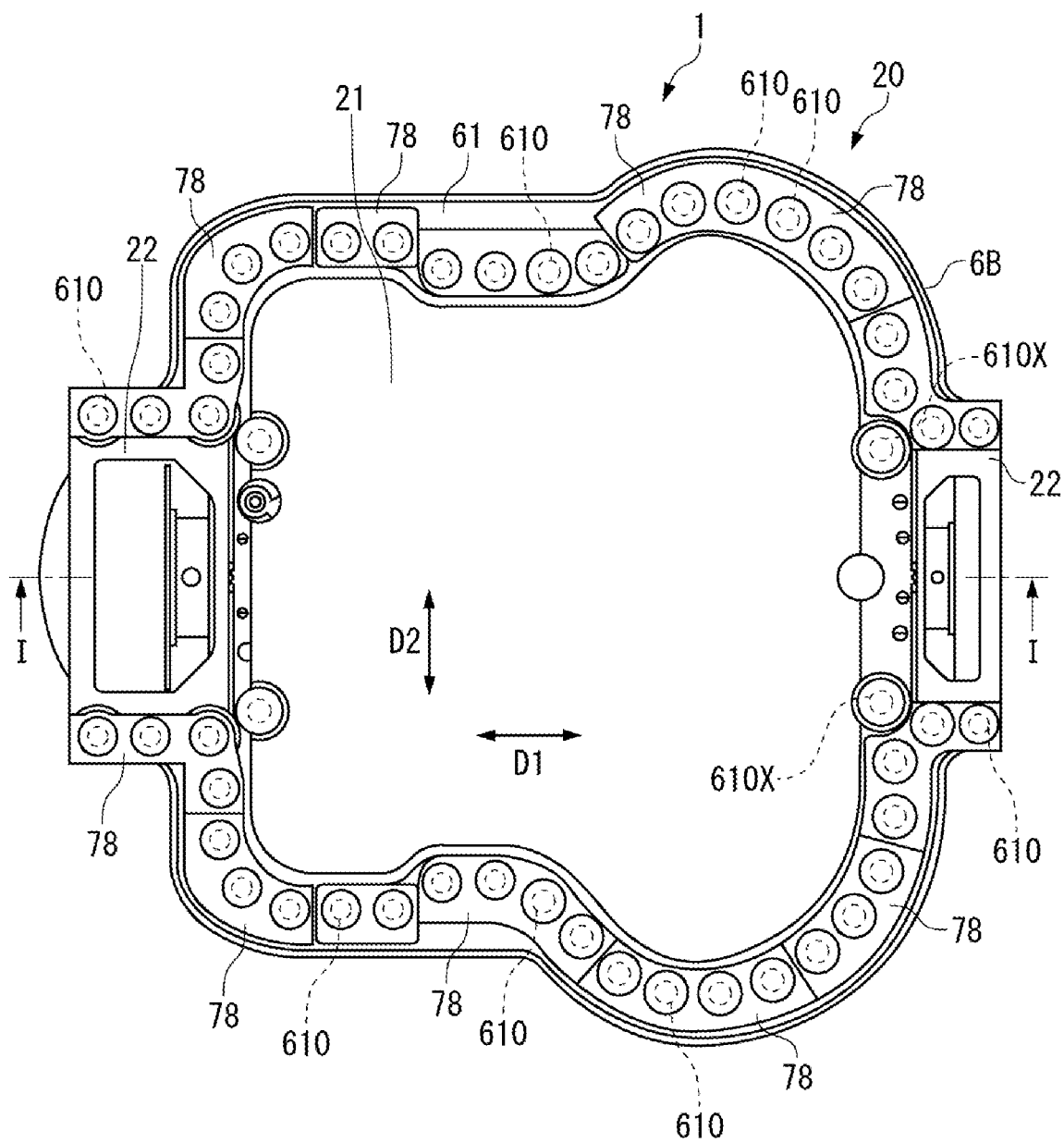
FIG. 3 is a plan view illustrating the compressor illustrated in FIG. 2.

As illustrated in FIG. 1 and FIG. 3, the upper-half casing 20 includes a housing portion 21 that houses the rotor 3 and the diaphragm group 4, a surrounding portion 22 that surrounds the seal housing holder 51, and the flange 61 (FIG. 2) that protrudes outward in the horizontal direction from a lower end of each of the housing portion 21 and the surrounding portion 22.

The housing portion 21 includes a semi-cylindrical peripheral wall 210, a front wall 211 closing a front end of the peripheral wall 210, and a rear wall 212 closing a rear end of the peripheral wall 210.

The surrounding portion 22 is formed in a semi-cylindrical shape having a diameter smaller than a diameter of the housing portion 21, and is disposed on each of front side (upstream side) of the housing portion 21 and rear side (downstream side) of the housing portion 21.

The flange 61 (FIG. 2 and FIG. 3) is disposed over the entire lower end of each of the housing portion 21 and the surrounding portion 22. The flange 61 includes a large number of insertion holes 610 (FIG. 3) into which respective bolts are inserted. The insertion holes 610 are distributed and disposed over the entire circumference of the flange 61. A bolt 70 (FIG. 1) used to fasten the upper-half casing 20 and the lower-half casing 30 is inserted into each of the insertion holes 610.

In order to resist the pressure of the gas compressed by the final stage, a through bolt 70A (FIG. 1) is preferably used for each of insertion holes 610X (FIG. 3) located at positions that are located on the innermost side (upstream side) in the axis direction D1 and are the closest to the rotary shaft 3A in a radial direction D2 of the casing 6, among the insertion holes 610 near a rear end part 6B of the casing 6 at which the discharge port 17 is located. Each of the through bolts 70A enhances fastening force and achieves stress dispersion to a wider range around the shaft, as compared with a stud bolt 70B (FIG. 1).

For each of the other insertion holes 610, any of the stud bolt 70B and the through bolt 70A may be used.

The lower-half casing 30 (FIG. 1) also includes a housing portion 31, a surrounding portion 32 that surrounds the seal housing holder 51, and the flange 62 that protrudes outward in the horizontal direction from a lower end of each of the housing portion 31 and the surrounding portion 32, as with the upper-half casing 20.

The flange 62 (FIG. 2) of the lower-half casing 30 includes through holes into which the respective bolts are inserted, or includes female screws into which the respective bolts are screwed. Illustration of these through holes and the female screws is omitted.

An upper surface of the flange 62 of the lower-half casing 30 and a lower surface of the flange 61 of the upper-half casing 20 are abutted on each other. In the following, the upper surface of the flange 62 is referred to as a mating surface 612 (FIG. 4) of the flange 62, and the lower surface of the flange 61 is referred to as the mating surface 612 of the flange 61. The mating surface 612 of the flange 61 is formed flat along the horizontal direction.

Each of the above-described through bolts 70A (FIG. 1 and FIG. 2) includes a head part 701 (fastening end part) and a shaft part. The shaft parts of the through bolts 70A penetrate through the respective insertion holes 610 (FIG. 3) of the flange 61 of the upper-half casing 20 and not-illustrated respective through holes of the flange 62 of the lower-half casing 30 while the lower surface of the flange 61 and the upper surface of the flange 62 are abutted on each other. The shaft parts of the through bolts 70A protruding downward from the flange 62 are screwed into respective nuts 71 (fastening end parts) illustrated in FIG. 1 and FIG. 2. The through bolts 70A and the nuts 71 configure fastening members.

Each of the above-described stud bolts 70B includes a screw on each of end sides. The stud bolts 70B are inserted into the respective insertion holes 610 of the flange 61 and the respective female screws of the flange 62 of the lower-half casing 30. Upper end parts of the stud bolts 70B are screwed into respective nuts 72 (fastening end parts) functioning as bolt head parts. The stud bolts 70B and the nuts 72 configure fastening members.

Each of the through bolts 70A, the stud bolts 70B, and the nuts 71 and 72 has yield strength greater than yield strength of each of the flanges 61 and 62.

When axial force (fastening force) of the bolts 70 such as the through bolts 70A and the stud bolts 70b sufficiently acts on the flange 61 and the flange 62, the flange 61 and the flange 62 are reliably fastened with sufficient fastening force.

During operation of the compressor 1, it is necessary to prevent the gas inside the casing 6 from being leaked to the outside of the casing 6 through an opening (gap) that occurs on the mating surface 612 of the flange 61 due to pressure of the gas. Further, it is necessary to prevent the gas inside the casing 6 from being leaked from a gap between the mating surfaces 612 due to thermal deformation of the flanges 61 and 62. The thermal deformation of the flanges 61 and 62 is caused by temperature difference between the upstream side and the downstream side inside the casing 6 with temperature increase by compression of the gas, in particular, temperature difference between the temperature of the high-pressure gas near the rear end part in the casing 6 and the temperature of the bearing (not illustrated) located near the rear end part of the casing 6.

To prevent the leakage, it is important to distribute the fastening force to a wide range around the shafts of the bolts 70. To achieve distribution of the fastening force, a multi-hole washer 78 (FIG. 2, FIG. 3, and FIG. 6) shared by two or more adjacent bolts 70 is used in the present embodiment.

Before description of the multi-hole washer 78, a normal washer used for the single bolt 70 is described.

Figure 4A:
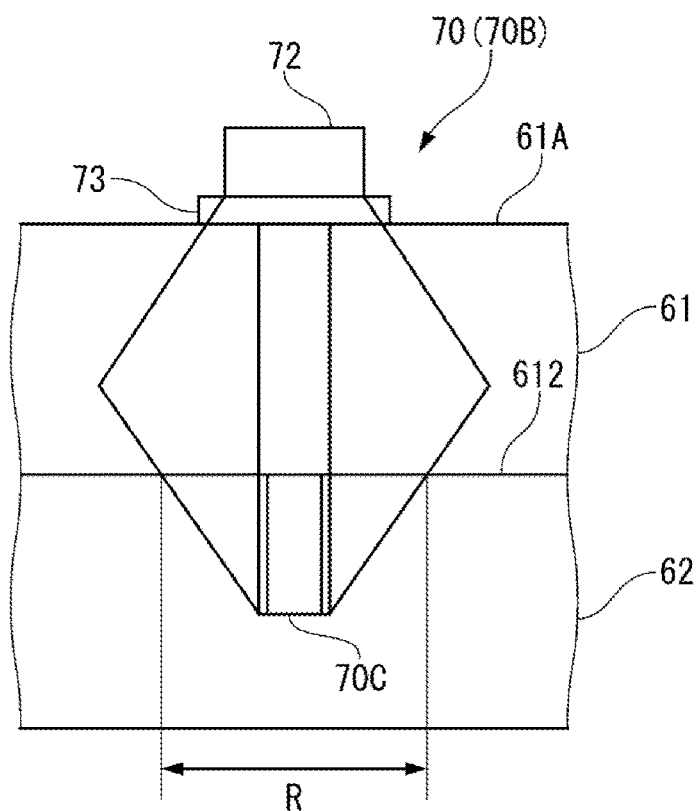
FIGS. 4A and 4B each illustrate an example in which a normal washer used for a single bolt is used unlike a multi-hole washer used in an embodiment, FIG. 4A being a schematic diagram illustrating a range where fastening force is distributed in a case of using a stud bolt, and FIG. 4B being a schematic diagram illustrating a range where fastening force is distributed in a case of using a through bolt.

As illustrated in FIG. 4A, the flanges 61 and 62 are fastened by the bolt 70 (stud bolt 70B). A washer 73 is disposed between the head part (nut 72) of the bolt 70 and the flange 61. The fastening force by the bolt 70 is distributed from the head part of the bolt 70 toward the flange 61 through the washer 73 so as to conically expand around a shaft center of the bolt 70. Accordingly, the fastening force is distributed also from a front end 70C of the shaft part of the bolt 70 so as to conically expand in a direction opposite to the direction expanding from the head part.

As illustrated in FIG. 4A, the fastening force is distributed over a range R on the mating surfaces 612. In a case of the stud bolt 70B, the maximum distribution range where the fastening force is distributed up to the position farthest from the shaft in the radial direction is positioned between an upper surface and the mating surface 612 of the flange 61.

Figure 4B:
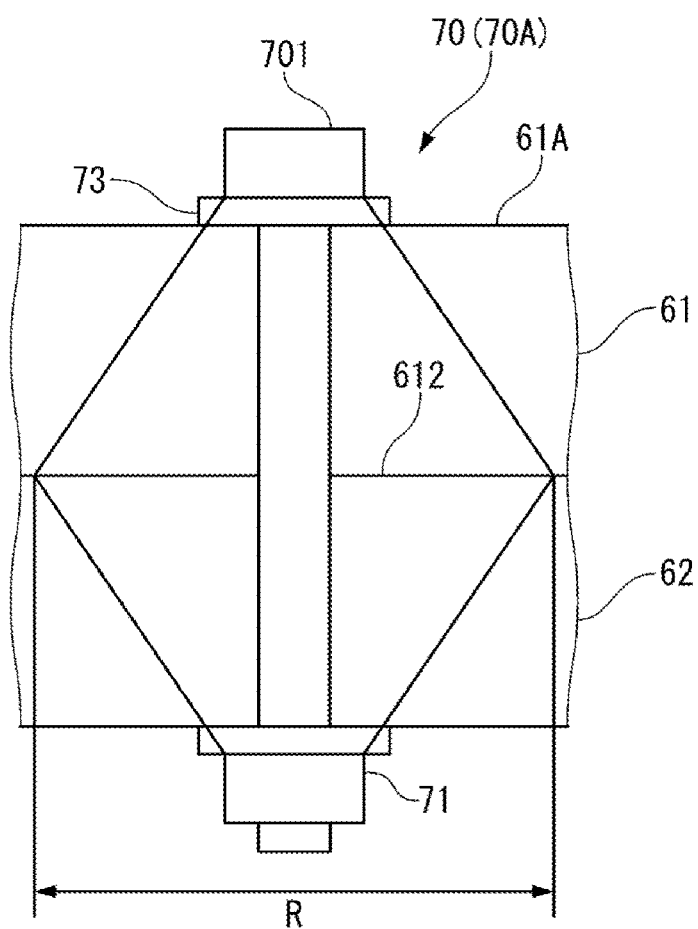

Also in the case of the through bolt 70A as illustrated in FIG. 4B, the fastening force is distributed from the head part 701 toward the flange 61 through the washer 73 so as to conically expand around a shaft center of the bolt 70A. The fastening force is distributed also from the nut 71 provided at the lower end part of the through bolt 70A so as to conically expand in the opposite direction, in a vertically symmetrical manner.

In the case of using the through bolt 70A, the fastening force is distributed up to the position separated from the shaft in the radial direction as compared with the stud bolt 70B because a shaft length of the through bolt 70A is larger than a shaft length of the stud bolt 70B. This makes it possible to expand the range R where the fastening force is distributed on the mating surfaces 612, as compared with the case of using the stud bolt 70B.

In the example illustrated in FIG. 4B, a thickness of the flange 61 and a thickness of the flange 62 are equal to each other, and the fastening member configured of the through bolt 70A and the nut 71 and the flanges 61 and 62 are disposed line-symmetrically (vertically symmetrically) with respect to the mating surfaces 612. This makes it possible to obtain the maximum distribution range R where the fastening force is distributed up to the position farthest from the shaft in the radial direction, on the mating surfaces 612.

To sufficiently prevent the leakage, however, the distribution ranges R1 and R2 illustrated in FIGS. 4A and 4B are insufficient, and it is necessary to bring the stress distribution on the mating surfaces 612 of the respective flanges 61 and 62 close to uniform distribution by distributing the fastening force to a wider range. Then, it is possible to increase the fastening force and to enhance the leakage prevention effect while avoiding local yield of the flanges 61 and 62 caused by increase of the internal pressure and the thermal deformation during the operation.

Distribution of the fastening force to the wider range with use of the washer disposed in the single bolt 70 is examined. In this example, the distribution model of the fastening force in the case of using the stud bolt 70B is described.

Figure 5A:
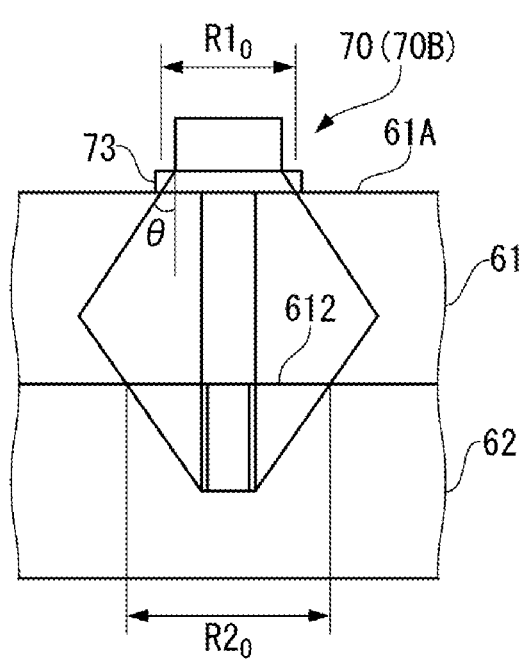
FIGS. 5A to 5D are schematic diagrams each illustrating a range where fastening force is distributed in respective cases where various washers are used for a single bolt.

FIG. 5A illustrates a state where the fastening force of the bolt 70 is distributed in the case of using the washer 73 typically selected for the bolt 70, as with FIG. 4A. The washer 73 is an annular plain washer.

Figure 5B:
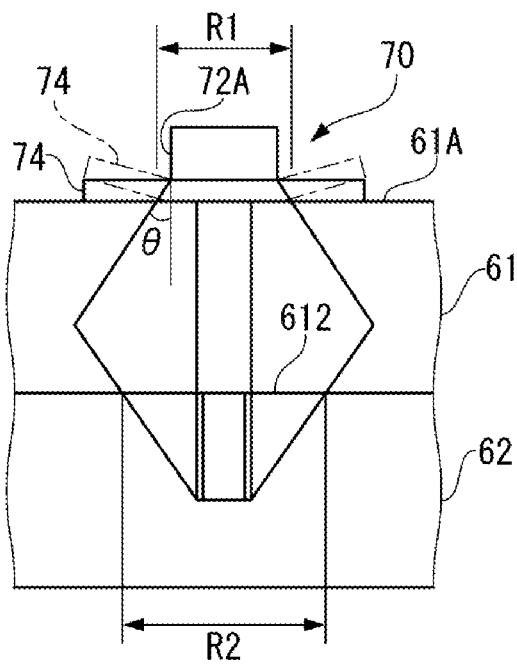
Figure 5C:
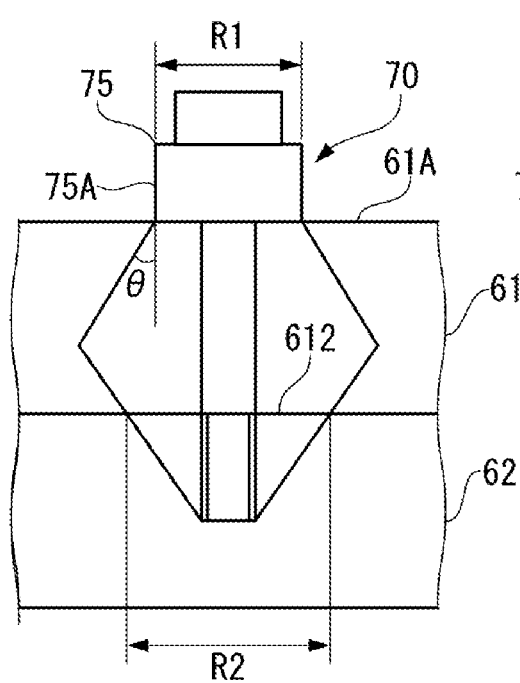
Figure 5D:
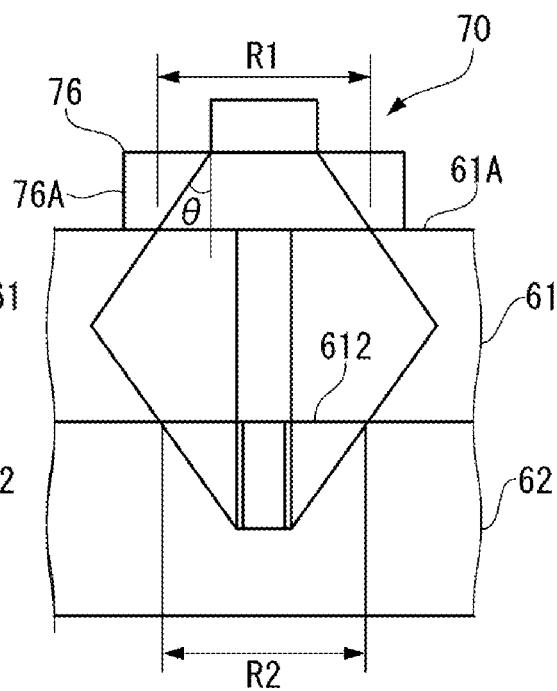

FIGS. 5B to 5D respectively illustrate cases of using washers 74 to 76 that are changed in thickness or cross-sectional area from the washer 73.

In FIGS. 5A to 5D, a range where the fastening force is distributed on a bearing surface 61A of the flange 61 supporting the head part of the bolt 70 is denoted by R1, and a range where the fastening force is distributed on the mating surfaces 612 of the flanges 61 and 62 is denoted by R2.

A distribution angle θ of the fastening force is equivalent between FIGS. 5A to 5D.

As illustrated in FIG. 5B, in a case where the washer 74 that has a cross-sectional area in the axis direction (lateral cross-sectional area) is wider than the cross-sectional area in the axis direction of the washer 73, the fastening force locally acts on inner peripheral side of the washer 74, and the washer 74 is accordingly plastically deformed. Therefore, the fastening force is conically distributed from a position of an outer peripheral part 72A of the head part of the bolt 70 that bends the washer 74, toward the flange 61 on the bearing surface 61A. As a result, it is not possible to distribute the fastening force to a sufficiently large range.

Next, in FIG. 5C, the washer 75 that is thicker than the washer 73 is used. The cross-sectional area of the washer 75 is equivalent to the cross-sectional area of the reference washer 73. Accordingly, the fastening force is conically distributed toward the flange 61 from an outer peripheral part 75A of the washer 75 that is located substantially just below the outer peripheral part of the head part of the bolt.

In FIG. 5D, the washer 76 that has a cross-sectional area and a thickness larger than the cross-sectional area and the thickness of the reference washer 73. In this case, the fastening force is distributed from the head part of the bolt toward an outer peripheral part 76A of the thick washer 76, and is further distributed to the flange 61.

In the case of the washers 74 and 75 respectively illustrated in FIGS. 5B and 5C described above, an effect to expand the distribution ranges R1 and R2 of the fastening force from distribution ranges $R1_0$ and $R2_0$ obtained by the reference washer 73 is not achieved on both of the bearing surface 61A and the mating surfaces 612.

In the case of the washer 76 illustrated in FIG. 5D, the distribution effect on the bearing surface 61A is higher than the distribution effect of the reference washer 73 because the head part of the bolt and the bearing surface 61A are separated by the thickness of the washer 76. The distribution angle θ of the fastening force, however, is equivalent to the distribution angle θ of the fastening force of the reference washer 73. Accordingly, the distribution effect on the mating surfaces 612 is equivalent to the distribution effect of the reference washer 73.

As described above, even when the thickness or the cross-sectional area of the washer disposed for the single bolt 70 is changed or the through bolt 70A is used, the fastening force cannot be distributed around the shaft to a degree achieving the sufficient leakage prevention effect.

Accordingly, in the present embodiment, the multi-hole washer 78 (FIG. 6) shared by the plurality of bolts 70 adjacent in the circumferential direction of the flanges 61 and 62 is used. The multi-hole washer 78 is formed in a flat plate shape, and includes a plurality of circular holes (not illustrated) individually corresponding to the plurality of bolts 70. The respective bolts 70 are inserted into the respective holes.

The flanges 61 and 62 according to the present embodiment are fastened with use of the plurality of bolts 70 and the multi-hole washer 78.

The multi-hole washer 78 is in contact with the upper surface of the flange 61 from one end to the other end in the circumferential direction of the flange 61.

The multi-hole washer 78 has a wide cross-sectional area enough to reach one bolt 70 to an adjacent bolt 70, and a region of the multi-hole washer 78 between the adjacent bolts 70 is also in contact with the upper surface of the flange 61.

The multi-hole washer 78 can largely expand both of the distribution range R1 on the bearing surface 61A and the distribution range R2 on the mating surfaces 612 from the position of the bolt 70 that is located at one end of an array of the bolts 70 continuously adjacent to one another to the bolt 70 that is located on the other end of the array of the bolts 70, as compared with the case where the washer 73 for the single bolt 70 is used (FIG. 4A).

The number of bolts 70 sharing the multi-hole washer 78 is optional as long as the number is two or more. FIG. 2 illustrates an example in which the multi-hole washer 78 is continuously formed over the substantially entire circumference of the flanges 61 and 62. In this case, the multi-hole washer 78 is shared by the large number of bolts 70 that are continuously adjacent to one another in the circumferential direction of the flange 61 except for the bolt 70, the bearing surface of which is set on the pedestal 24 located higher than the flange 61. For example, the multi-hole washer 78 can be divided into two parts along the axis direction D1.

The multi-hole washer 78 can be easily manufactured in a case where the multi-hole washer 78 is divided in the circumferential direction of the flange 61 and 62. In the example illustrated in FIG. 3, the multi-hole washers 78 each shared by about two to four bolts 70 continuously adjacent to one another are arranged along the circumferential direction of the flange 61.

Figure 6:
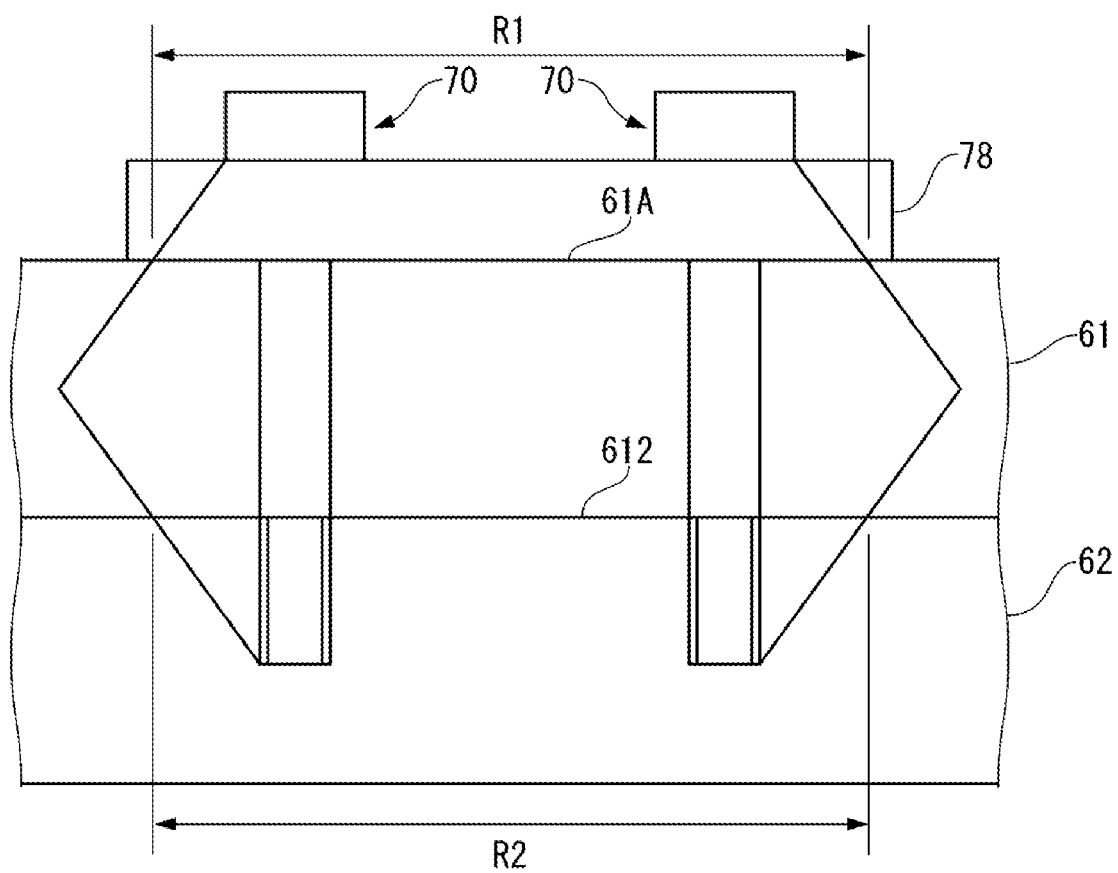
FIG. 6 is a schematic diagram illustrating a state where a multi-hole washer according to the embodiment is shared by two bolts used for fastening of flanges.

It is assumed that the thickness of the multi-hole washer 78 (FIG. 6) is insufficient, and the multi-hole washer 78 or the flange 61 yields by the surface pressure occurred on the position of the bearing surface 61A during the operation. For example, if the multi-hole washer 78 yields, a part not coming into contact with the upper surface of the flange 61 occurs on the multi-hole washer 78, as with FIG. 4B. As a result, the multi-hole washer 78 floats from the upper surface of the flange 61 between the adjacent bolts 70 and does not come into contact with the upper surface of the flange 61. Accordingly, the fastening force is distributed only to the degree equivalent to the washer 73 (FIG. 4A) for the single bolt 70, and the wide distribution ranges R1 and R2 each continuous between the adjacent bolts 70 as illustrated in FIG. 6 cannot be obtained.

In a case where the flange 61 is pressed by the multi-hole washer 78 and is caved due to excessive surface pressure occurred at the position of the bearing surface 61A, the distribution ranges R1 and R2 of the fastening force are narrowed and the fastening force by the bolts 70 is reduced because the shaft length of each of the bolts 70 is reduced.

To avoid local yield of the flanges 61 and 62 that occurs due to the local excessive surface pressure on the mating surfaces 612 caused by insufficient distribution range R2 on the mating surfaces 612, it is necessary to set the appropriate thickness of the multi-hole washer 78 by considering stress dispersion so as not to generate the excessive surface pressure on the bearing surface 61A.

A condition to determine the thickness T necessary for the multi-hole washer 78 is described with reference to FIG. 7.

A thick solid line indicates surface pressure p1 on the bearing surface 61A (fastening force/cross-sectional area of multi-hole washer). The surface pressure p1 is gradually reduced as the thickness T of the washer is increased. The pressure p1 is larger than pressure p2 described below.

A thin solid line indicates yield surface pressure ps of a material (for example, stainless steel) used for the flanges 61 and 62. The yield surface pressure of the material of the flanges 61 and 62 according to the present embodiment is lower than yield surface pressure of a material used for the multi-hole washer 78.

It is assumed that, in a case where the relationship of the yield surface pressure between the materials is reversed to the above-described relationship, the yield surface pressure ps corresponds to the yield surface pressure of the material for the multi-hole washer 78.

Figure 7:
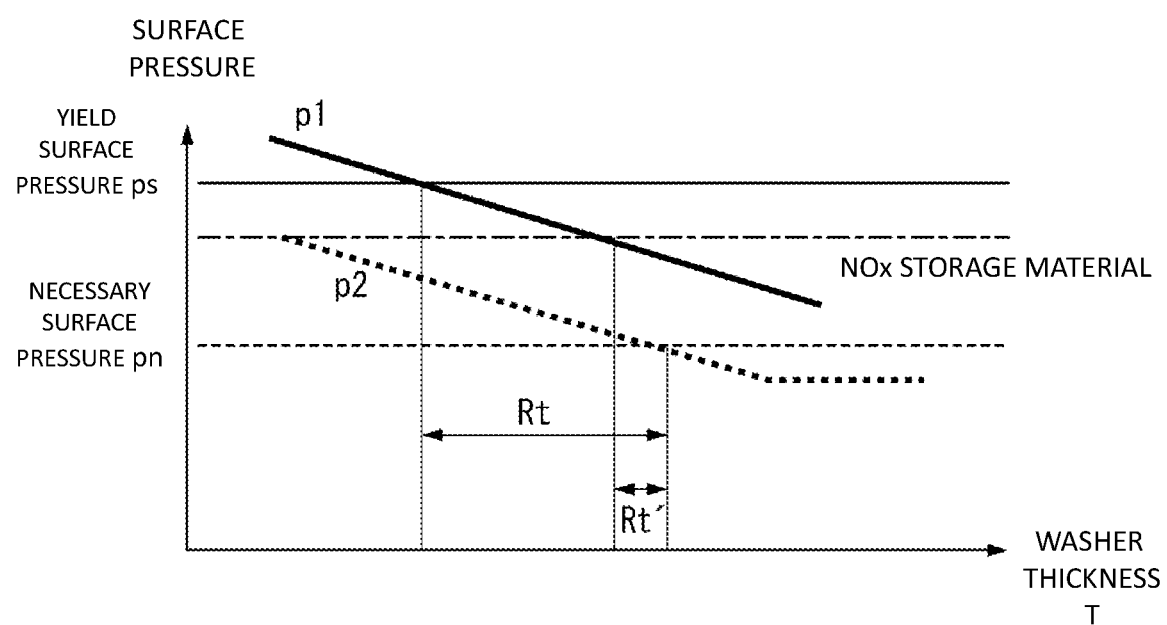
FIG. 7 is a graph illustrating relationship of surface pressure on each of a bearing surface and a mating surface with a thickness of the multi-hole washer.

A thick dashed line illustrated in FIG. 7 indicates the surface pressure p2 of the mating surfaces 612 (fastening force/area of region where fastening force is distributed on mating surfaces). The surface pressure p2 is gradually reduced as the thickness T of the washer is increased, and thereafter, is substantially converged to a predetermined value.

A thin dashed line indicates surface pressure pn necessary to sufficiently suppress the leakage. The necessary surface pressure pn is determined based on pressure of the high-pressure gas inside the casing 6.

To sufficiently distribute the fastening force, it is necessary to avoid one or both of the multi-hole washer 78 and the flanges 61 and 62 from yielding due to application of excessive stress to the bearing surface 61A, and to secure, on the mating surfaces 612, surface pressure that can prevent opening of the mating surfaces 612 to sufficiently suppress the leakage.

In other words, it is necessary to determine the thickness T of the multi-hole washer 78 within a thickness range Rt where the stress acting on the bearing surface 61A is lower than the yield strength of the material for the multi-hole washer 78 and is lower than the yield strength of the material for the flanges 61 and 62 (condition 1) as well as the surface pressure p2 on the mating surfaces 612 is equal to or higher than the necessary surface pressure pn (condition 2).

Note that, in FIG. 7, yield surface pressure on the bearing surface of NOx (nitrogen oxide) storage material occluding NOx is illustrated by an alternate long and short dash line. The yield surface pressure is lower than the yield surface pressure ps of the material according to the present embodiment. Accordingly, in the case of using the NOx storage material, a thickness range Rt' allowable for the multi-hole washer 78 is narrower than the range Rt.

A method of setting the thickness T of the multi-hole washer 78 is described based on the above description.

The condition 1 and the condition 2 described below allows for setting of the thickness T of the multi-hole washer 78 that achieves the sufficient distribution range R2 on the mating surfaces 612 while preventing the multi-hole washer 78 and the flange 61 from yielding on the bearing surface 61A.

Figure 8A:
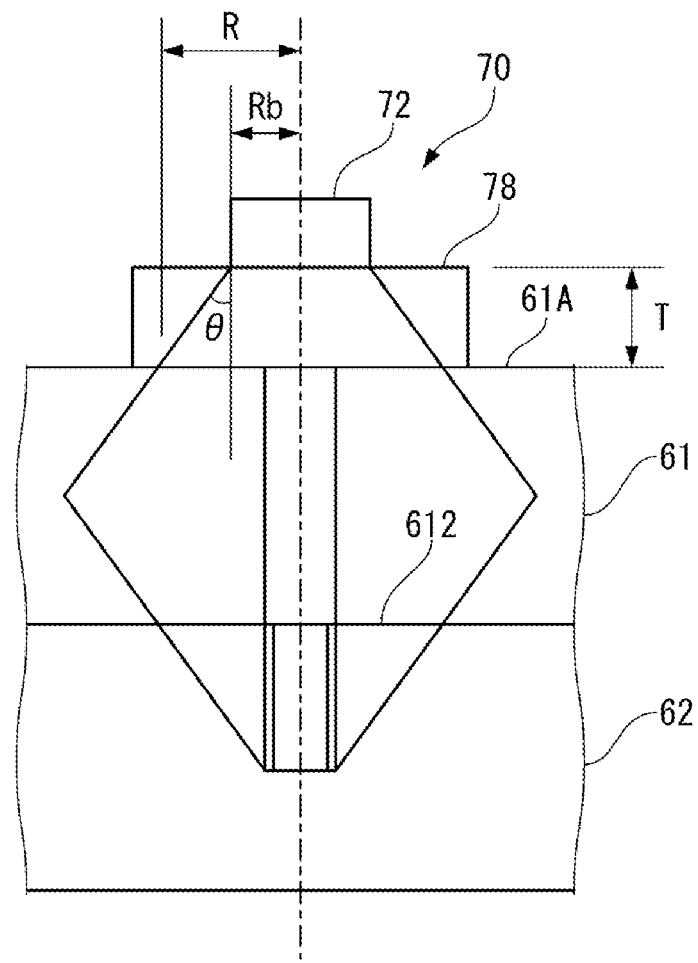
FIGS. 8A and 8B are schematic diagrams each illustrating a method of calculating the thickness of the multi-hole washer.
Figure 8B:
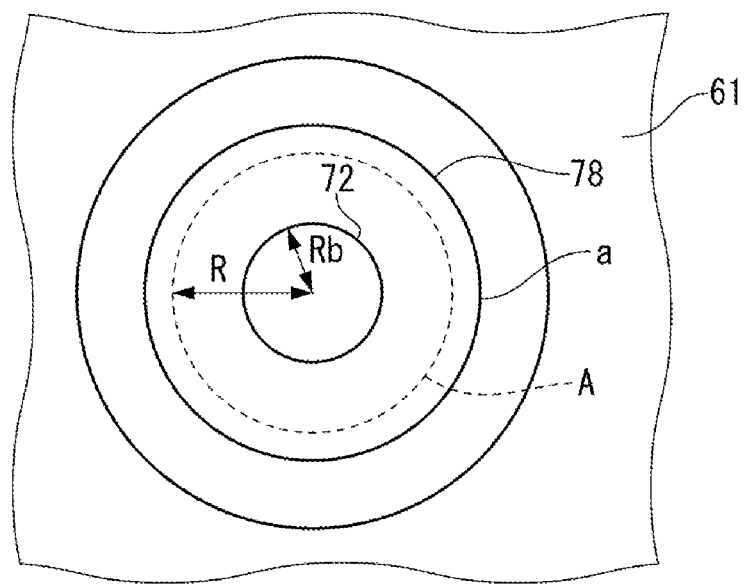

Condition 1 (see FIGS. 8A and 8B)

$$F/A < \sigma y$$

Fastening force: F
Thickness of multi-hole washer: T
Distribution angle: θ
Radius of bolt head part: Rb
Distribution radius on bearing surface: R=Rb+T·tan θ
Distribution area on bearing surface: A=πR²
Bearing stress on bearing surface: F/A
Yield strength of material: σy In this case, the distribution angle θ corresponds to a distribution angle of the fastening force distributed from the head part (72) of each of the bolts 70 to the flange 61 through the multi-hole washer 78. The distribution angle θ is, for example, about 30 degrees to 45 degrees.

The yield strength σy of the material corresponds to a lower one of the yield strength of the material for the flanges 61 and 62 and the yield strength of the material for the multi-hole washer 78. Alternatively, in a case where the yield strength of the material for the flanges 61 and 62 and the yield strength of the material for the multi-hole washer 78 are equal to each other, the yield strength σy of the material corresponds to such yield strength.

Condition 2 (see FIG. 6 and FIG. 8B)

$$F/a \geq pn$$

Distribution area on mating surface: a
Surface pressure on mating surface: F/a
Necessary surface pressure: pn The distribution area a on the mating surface is regarded as the lateral cross-sectional area of the multi-hole washer 78.

The thickness T of the multi-hole washer 78 can be determined such that the condition 1 and the condition 2 described above are established, namely, such that the bearing stress F/A on the bearing surface is lower than the yield strength σy of the material as well as the surface pressure F/a on the mating surface is equal to or higher than the necessary surface pressure pn determined based on the pressure of the gas inside the casing 6 during the operation.

The through bolts 70A (FIG. 9) are also considered in a manner similar to the above from both end sides of the shaft.

More specifically, the appropriate thickness range for the thickness T of each of the multi-hole washers 78 disposed on the both end sides of the through bolts 70 is derived from the condition 1 (F/A<σy) and the condition 2 (F/a≥pn) described above.

Figure 9:
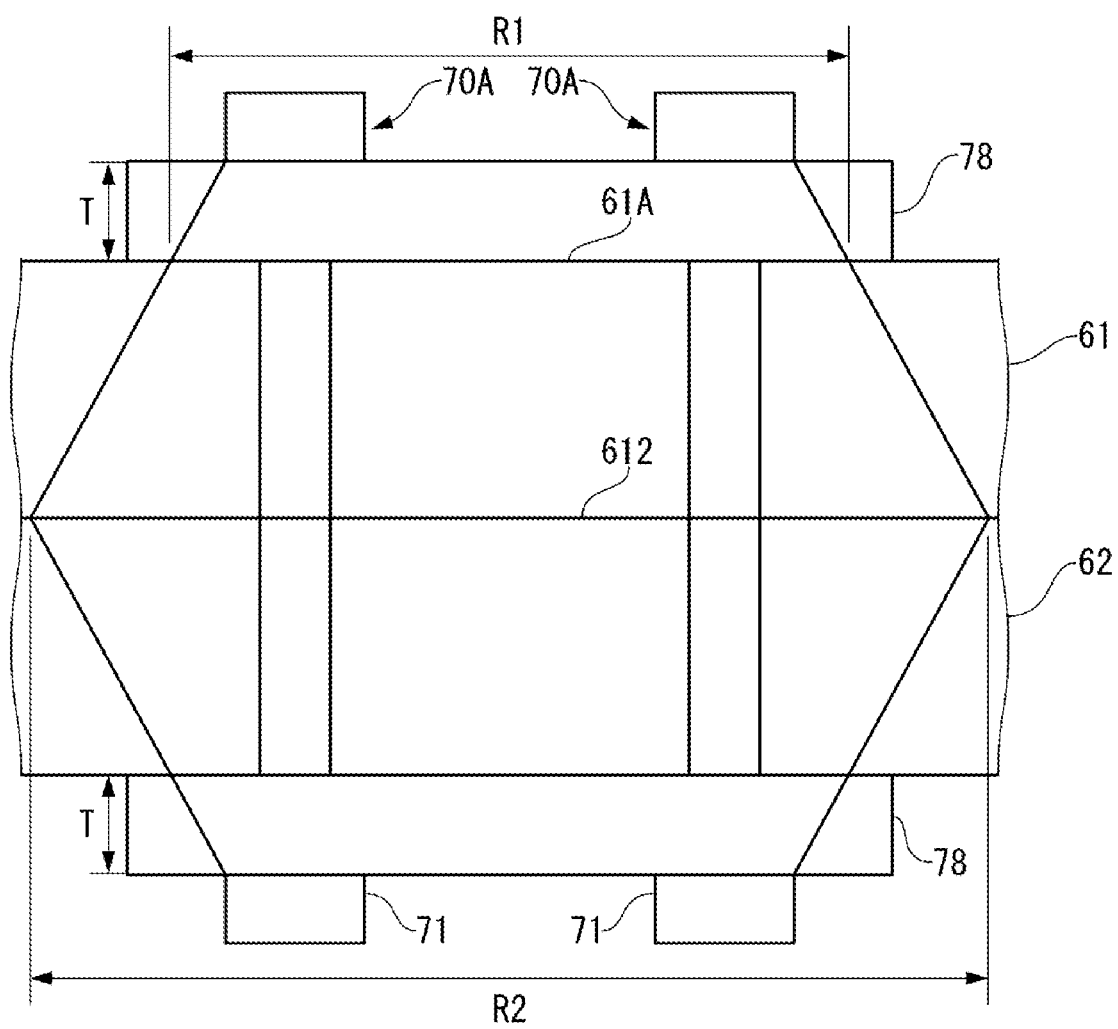
FIG. 9 is a schematic diagram illustrating an example in which the multi-hole washer is disposed on each of end sides of a through bolt.

As illustrated in FIG. 9, the multi-hole washer 78 can be disposed on each of the one end side and the other end side of the through bolts 70A.

As with the example illustrated in FIG. 9, the fastening members configured of the through bolts 70A and the nuts 71, the multi-hole washers 78 and 78, and the flanges 61 and 62 are preferably disposed line-symmetrically with respect to the mating surfaces 612. This makes it possible to secure the maximum distribution range R2 on the mating surfaces 612 where the fastening force is desirably distributed to the wide range in order to bring the stress distribution close to uniform distribution.

Note that the fastening members, the multi-hole washers 78 and 78, and the flanges 61 and 62 are not necessarily disposed line-symmetrically with respect to the mating surfaces 612. The thicknesses of the flanges 61 and 62 may be different from each other and the maximum distribution range may be accordingly obtained at a position shifted from the mating surfaces 612 in a shaft direction.

When the through bolts 70A are used and the multi-hole washers 78 are disposed on the both end sides of the through bolts 70A as illustrated in FIG. 9, it is possible to sufficiently secure both of the distribution range R1 on the bearing surface 61A and the distribution range R2 on the mating surfaces 612 by a synergistic effect of the long shaft length of each of the through bolts 70A and use of the multi-hole washers 78 shared by the plurality of bolts 70A.

As described above, according to the present embodiment, using the multi-hole washer 78 shared by the plurality of bolts 70 makes it possible to largely expand both of the distribution range R1 on the bearing surface 61A and the distribution range R2 on the mating surfaces 612 including the region between the adjacent bolts 70, to a degree not achievable by the washer 73 for the single bolt 70. Accordingly, the stress distribution on the mating surfaces 612 of the flanges 61 and 62 during the operation is brought close to uniform distribution while preventing the multi-hole washer 78 and the flange 61 from yielding on the bearing surface 61A. This makes it possible to maintain the fastening force and to sufficiently suppress leakage while avoiding local yield of the flanges 61 and 62 caused by increase of the internal pressure and the thermal deformation.

The multi-hole washer 78 according to the present embodiment achieves uniformization of the stress distribution on the mating surfaces 612 and avoids the local yield. This also makes it possible to increase the fastening force and to enhance the leakage prevention effect.

A configuration to prevent leakage provided in the casing 6 according to the present embodiment is described below. When the compressor 1 including the configuration described below is manufactured through a designing method relating to the above-described multi-hole washer 78, it is possible to more sufficiently prevent the leakage from the rear end part of the casing 6 at which the pressure of the gas becomes the maximum, through a gap between the flanges 61 and 62.

(1) The discharge volute 16 (FIG. 1) is formed in a shape that expands so as to wind toward the inside of the axis direction D1, and (2) the through bolts 70A are used as the bolts 70 closest to the final stage of the impeller 2 and the rotary shaft 3A, and the bearing surface of each of the through bolts 70A is made higher than the position of the bearing surface of each of the other bolts 70.

The bearing surface of each of the through bolts 70A corresponds to an upper surface of the pedestal 24 (FIG. 1) at the rear end part of the upper-half casing 20 and a lower surface of the pedestal 34 (FIG. 1) at the rear end part of the lower-half casing 30. The bearing surface of each of the nuts 71 into which the shaft part of the corresponding through bolt 70A is screwed corresponds to the lower surface of the pedestal 34.

Providing these pedestals 24 and 34 makes it possible to prevent the through bolts 70A and the members receiving the through bolts 70A from interfering with the position of the discharge volute 16 while securing the necessary thickness at the rear end part of the casing 6 in terms of strength.

When the position of the discharge volute 16 is shifted inward in the axis direction D1 in the above-described configuration (1), the temperature gradient from the discharge port 17 to the bearing on the rear end side of the rotary shaft 3A is moderated. This makes it possible to suppress thermal deformation of the flanges 61 and 62 caused by the steep temperature difference, and to prevent leakage.

Further, since the discharge volute 16 is retreated inward in the axis direction D1 by the above-described configuration (1), it is possible to provide the through bolts 70A at the positions as close as possible to the final stage and the rotary shaft 3A like the positions of the insertion holes 610X in FIG. 3 and to avoid the rotary shaft 3A from being lengthened, while securing the thickness necessary for the casing 6 by the above-described configuration (2). When the rotary shaft 3A has a short length, it is possible to sufficiently secure rigidity of the rotary shaft 3A. When the diameter of the rotary shaft 3A is reduced while the rigidity is secured, it is possible to downsize the casing 6.

The insertion holes 610X are located near the seal housing holder 51 both in the axis direction D1 and in the radial direction D2. Since the insertion holes 610X are located close to the end edge of the flange 61 on the inner peripheral side, the surface pressure is secured up to the end edge of the flange 61 on the inner peripheral side by the bolts inserted into the respective insertion holes 610X. As a result, it is possible to improve sealability by the flanges 61 and 62.

Other than the above, the configurations described in the above-described embodiment can be selected or appropriately modified without departing from the scope of the present invention.

The present invention can be used to manufacture a case of various machines such as a supercharger and a pump, or various structures such as a pressure container and pipes in addition to the casing 6 of the compressor 1 as long as flanges to be fastened are provided and the pressure of the internal fluid (gas or liquid) acts on the flanges.

Thus, the "fluid device" according to the present invention includes various machines including a casing and a case, containers, and pipes.

The fastening member according to the present invention is not limited to the bolt, and include general fasteners (including rivet) including a member not threaded.

Depending on arrangement of the bolts 70 on the flanges 61 and 62, the multi-hole washer according to the present invention can be shared by two bolts adjacent in a direction different from the circumferential direction of the flanges 61 and 62, for example, in the radial direction of the flanges 61 and 62.

REFERENCE SIGNS LIST

1 Centrifugal compressor (fluid device)
2 Impeller
3 Rotor (compression mechanism)
3A Rotary shaft
4 Diaphragm group
5 Seal device
6 Casing
11 Suction port
12 Suction flow path
13 Diffuser flow path
14 Bent flow path
15 Return flow path
16 Discharge volute
17 Discharge port
20 Upper-half casing (half body)
21 Housing portion
22 Surrounding portion
24 Pedestal
30 Lower-half casing (half body)
31 Housing portion
32 Surrounding portion
34 Pedestal
40 Diaphragm
40A, 40B Member
40R Return vane
51 Seal housing holder
52 Seal member
61 Flange
61A Bearing surface
62 Flange
70 Bolt
70A Through bolt
70B Stud bolt
70C Front end
71, 72 Nut (fastening end part)
72A Outer peripheral part
73 Washer
74 to 76 Washer
75A Outer peripheral part
76A Outer peripheral part
78 Multi-hole washer
210 Peripheral wall
211 Front wall
212 Rear wall
610 Insertion hole
610X Insertion hole
612 Mating surface
701 Head part (fastening end part)
A Axis
D1 Axis direction
D2 Radial direction
p1 Surface pressure
p2 Surface pressure
pn Necessary surface pressure
ps Yield surface pressure
R Distribution range
R1, R2 Distribution range
$R1_0$, $R2_0$ Distribution range
Rt Thickness range
θ Angle

The invention claimed is:
1. A fluid device comprising a casing into which a fluid is introduced, the casing including half bodies, wherein
flanges provided on the respective half bodies are fastened together with use of a plurality of fastening members and a washer shared by two or more adjacent fastening members out of the plurality of fastening members, and
when F is fastening force by each of the fastening members, T is a thickness of the washer, θ is a distribution angle of the fastening force distributed to the flanges from a fastening end part that is an end part of each of the fastening members disposed on the washer, through the washer, Rb is a radius of the fastening end part, R is a radius of a distribution range of the fastening force on a bearing surface of the flange supporting the washer, A is an area of the distribution range of the fastening force on the bearing surface, a is an area of a distribution range of the fastening force on a mating surface of each of the flanges, and R=Rb+ T·tan θ and A=πR² are established, F/A is lower than yield strength of a material for the flanges and yield strength of a material for the washer, and F/a is equal to or higher than predetermined surface pressure that is determined based on pressure of the fluid inside the casing during operation.

2. The fluid device according to claim 1, wherein the area a of the distribution range of the fastening force on the mating surface of each of the flanges corresponds to a lateral cross-sectional area of the washer.

3. The fluid device according to claim 2, wherein at least a part of the plurality of fastening members is a stud bolt including screws on respective ends.

4. The fluid device according to claim 3, wherein the casing contains a compression mechanism compressing the fluid.

5. The fluid device according to claim 2, wherein at least a part of the plurality of fastening members is a through bolt that penetrates through both of the abutted flanges.

6. The fluid device according to claim 5, wherein
the washer is disposed on each of one end side and another end side of the through bolt, and
the through bolt, the washer, and the flanges fastened by the through bolt are disposed line-symmetrically with respect to the mating surfaces.

7. The fluid device according to claim 6, wherein the casing contains a compression mechanism compressing the fluid.

8. The fluid device according to claim 5, wherein the casing contains a compression mechanism compressing the fluid.

9. The fluid device according to claim 2, wherein the casing contains a compression mechanism compressing the fluid.

10. The fluid device according to claim 1, wherein at least a part of the plurality of fastening members is a stud bolt including screws on respective ends.

11. The fluid device according to claim 10, wherein the casing contains a compression mechanism compressing the fluid.

12. The fluid device according to claim 1, wherein at least a part of the plurality of fastening members is a through bolt that penetrates through both of the abutted flanges.

13. The fluid device according to claim 12, wherein
the washer is disposed on each of one end side and another end side of the through bolt, and
the through bolt, the washer, and the flanges fastened by the through bolt are disposed line-symmetrically with respect to the mating surfaces.

14. The fluid device according to claim 13, wherein the casing contains a compression mechanism compressing the fluid.

15. The fluid device according to claim 12, wherein the casing contains a compression mechanism compressing the fluid.

16. The fluid device according to claim 1, wherein the casing contains a compression mechanism compressing the fluid.

17. The fluid device according to claim 16, wherein a discharge volute through which the compressed fluid passes toward a discharge port of the fluid device is provided to expand toward an inside of the casing in an axis direction.

\* \* \* \* \*